US008740453B2

(12) United States Patent
Torniainen et al.

(10) Patent No.: US 8,740,453 B2
(45) Date of Patent: Jun. 3, 2014

(54) MICROCALORIMETER SYSTEMS

(75) Inventors: Erik D. Torniainen, Redmond, WA (US); Pavel Kornilovich, Corvallis, OR (US); Alexander Govyadinov, Corvallis, OR (US); David P. Markel, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 13/077,071

(22) Filed: Mar. 31, 2011

(65) Prior Publication Data
US 2011/0286493 A1 Nov. 24, 2011

(51) Int. Cl.
*G01N 25/00* (2006.01)
*G01K 1/00* (2006.01)

(52) U.S. Cl.
USPC .............................. 374/31; 374/141; 374/148

(58) Field of Classification Search
USPC ............................................ 374/31, 141, 148
See application file for complete search history.

(56) References Cited

U.S. PATENT DOCUMENTS

| | | | |
|---|---|---|---|
| 3,552,207 A * | 1/1971 | Monk et al. ........................ | 374/31 |
| 3,856,467 A * | 12/1974 | Picker ............................ | 436/147 |
| 4,318,114 A | 3/1982 | Huliba | |
| 5,412,411 A | 5/1995 | Anderson | |
| 5,807,749 A * | 9/1998 | Hornemann ................... | 436/143 |
| 5,818,485 A | 10/1998 | Rezanka | |
| 5,820,260 A * | 10/1998 | Vander Heyden et al. ...... | 374/37 |
| 6,010,316 A | 1/2000 | Haller et al. | |
| 6,055,002 A | 4/2000 | Wen et al. | |
| 6,079,873 A * | 6/2000 | Cavicchi et al. ................. | 374/10 |
| 6,106,091 A | 8/2000 | Osawa et al. | |
| 6,152,559 A | 11/2000 | Kojima | |
| 6,193,413 B1 | 2/2001 | Lieberman | |
| 6,227,660 B1 | 5/2001 | McClelland et al. | |
| 6,244,694 B1 | 6/2001 | Weber et al. | |
| 6,283,718 B1 | 9/2001 | Prosperetti et al. | |
| 6,351,879 B1 | 3/2002 | Furlani et al. | |
| 6,360,775 B1 | 3/2002 | Barth et al. | |
| 6,431,694 B1 | 8/2002 | Ross | |
| 6,467,887 B2 | 10/2002 | Lopez et al. | |
| 6,568,799 B1 | 5/2003 | Yang et al. | |
| 6,631,983 B2 | 10/2003 | Romano, Jr. et al. | |

(Continued)

FOREIGN PATENT DOCUMENTS

| | | |
|---|---|---|
| JP | 1993-026170 | 2/1993 |
| JP | 10175307 | 6/1998 |

(Continued)

OTHER PUBLICATIONS

Cindy Hany et al; Thermal Analysis of Chemical Reaction With a Continuous Microfluidic Calorimeter; Chemical Engineering Journal 160 (2010); Jul. 10, 2009; pp. 814-822.

(Continued)

*Primary Examiner* — Mirellys Jagan

(57) ABSTRACT

In one embodiment, a microcalorimeter system includes a first microfluidic channel coupling a calorimeter with a sample chamber. A second microfluidic channel couples the calorimeter with a waste chamber. An inertial pump includes a fluid actuator integrated asymmetrically within the first microfluidic channel, and the fluid actuator is capable of selective activation to pump fluid from the sample chamber to the calorimeter and from the calorimeter to the waste chamber through the first and second microfluidic channels, respectively.

14 Claims, 16 Drawing Sheets

(56) References Cited

U.S. PATENT DOCUMENTS

| | | |
|---|---|---|
| 6,655,924 B2 | 12/2003 | Ma |
| 6,910,797 B2 | 6/2005 | Falcon |
| 6,953,236 B2 | 10/2005 | Silverbrook |
| 7,040,745 B2 | 5/2006 | Kent |
| 7,049,558 B2 | 5/2006 | Baer et al. |
| 7,118,189 B2 | 10/2006 | Kuester et al. |
| 7,182,442 B2 | 2/2007 | Sheinman |
| 7,204,585 B2 | 4/2007 | Bruinsma et al. |
| 7,427,274 B2* | 9/2008 | Harris et al. ............ 601/15 |
| 7,470,004 B2 | 12/2008 | Eguchi et al. |
| 7,543,923 B2 | 6/2009 | McNestry |
| 7,762,719 B2 | 7/2010 | Fon et al. |
| 7,763,453 B2 | 7/2010 | Clemmens et al. |
| 7,784,495 B2 | 8/2010 | Prakash et al. |
| 7,832,429 B2 | 11/2010 | Young et al. |
| 2001/0030130 A1 | 10/2001 | Ricco |
| 2002/0197167 A1 | 12/2002 | Kornelsen |
| 2005/0092662 A1 | 5/2005 | Gilbert et al. |
| 2006/0123892 A1* | 6/2006 | Brekelmans et al. ........ 73/61.76 |
| 2007/0026421 A1 | 2/2007 | Sundberg et al. |
| 2007/0286254 A1* | 12/2007 | Fon et al. ................ 374/31 |
| 2008/0007604 A1 | 1/2008 | Kang et al. |
| 2008/0047836 A1* | 2/2008 | Strand et al. ............. 204/644 |
| 2008/0055378 A1 | 3/2008 | Drury et al. |
| 2008/0079791 A1 | 4/2008 | Kang et al. |
| 2008/0118790 A1 | 5/2008 | Kim et al. |
| 2008/0143793 A1 | 6/2008 | Okuda |
| 2008/0260582 A1 | 10/2008 | Gauer et al. |
| 2009/0007969 A1 | 1/2009 | Gundel |
| 2009/0027458 A1 | 1/2009 | Leighton et al. |
| 2009/0040257 A1 | 2/2009 | Bergstedt et al. |
| 2009/0052494 A1* | 2/2009 | Wijffels ................ 374/10 |
| 2009/0079789 A1 | 3/2009 | Silverbrook |
| 2009/0147822 A1* | 6/2009 | Tokhtuev et al. ......... 374/142 |
| 2009/0246086 A1 | 10/2009 | Barbier et al. |
| 2009/0270834 A1 | 10/2009 | Nisato et al. |
| 2009/0297372 A1 | 12/2009 | Amirouche et al. |
| 2010/0013887 A1 | 1/2010 | Suh |
| 2010/0024572 A1* | 2/2010 | Roukes et al. ........... 73/862.625 |
| 2010/0173393 A1 | 7/2010 | Handique et al. |
| 2010/0212762 A1 | 8/2010 | Toonder et al. |
| 2012/0015376 A1* | 1/2012 | Bornhop .................. 435/7.2 |

FOREIGN PATENT DOCUMENTS

| | | |
|---|---|---|
| JP | 2001-205810 | 7/2001 |
| JP | 2003-527616 | 9/2003 |
| JP | 2003528276 | 9/2003 |
| JP | 2004-249741 | 9/2004 |
| JP | 2006512545 | 4/2006 |
| JP | 2006156894 | 6/2006 |
| JP | 2007-224844 | 9/2007 |
| JP | 2009117344 | 5/2009 |
| KR | 20050023512 | 7/2003 |
| KR | 20080004095 | 1/2008 |
| KR | 20090082563 | 7/2009 |
| KR | 20090108371 | 10/2009 |

OTHER PUBLICATIONS

Leslie Y. Yeo et al, Fast Inertial Microfluidic Actuation and Manipulation Using Surface Acoustic Waves; FEDSM-ICNMM2010 Meeting; Aug 1-5, 2010, pp. 1-8.

Daniel C. Leslie. et. al.; Frequency-specific Flow Control in Microfluidic Circuits with Passive Elastomeric Features; Nature Physics; Feb. 1, 2009; pp. 231-235.

Fadl et al; "The effect of the Microiluidic Diodicity on the Efficiency of Valve-Less Rectification Micropumps Using Lattice Boltzmann Method"; Microsyst Technol; Jul. 2009.

Inkjet Photo Printers, Ink, Paper, and Laser Toner Tool; Inkjet Printers Paper Reviews: inkjethelper.com.

Koltay et al; "Non-Contact Liquid Handling: Basics and Technologies"; http://www.labautopedia.com/mw/index.php/Non-Contact Liquid Handling: Basics and Technologies.

Sonia Rawrez-Garciaa, et.al.; Towards the Development of a Fully integrated Polymeric Microfluidic Platform for Environmental Analysis; Elesvier B.V.; Apr. 12, 2008; pp. 463-467.

\* cited by examiner

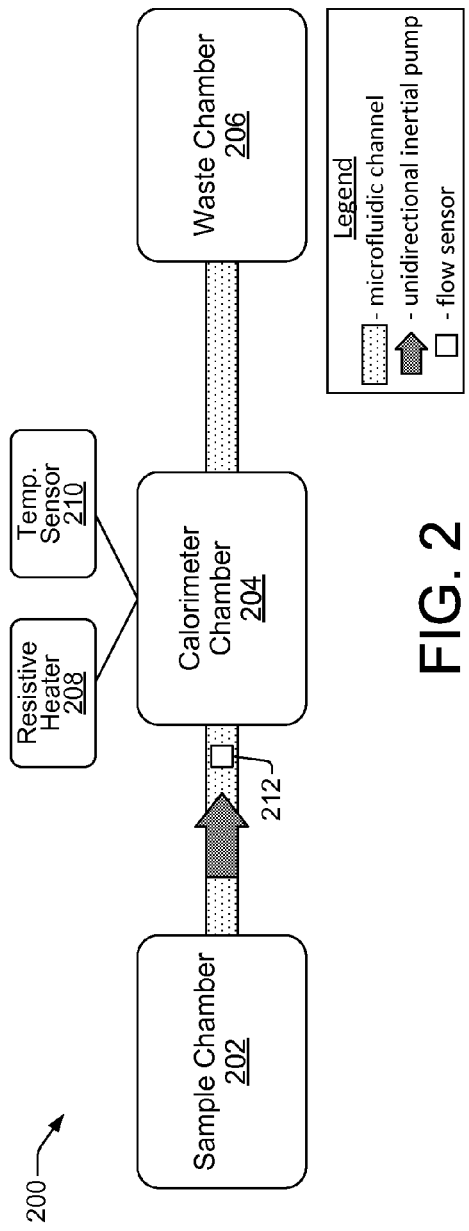
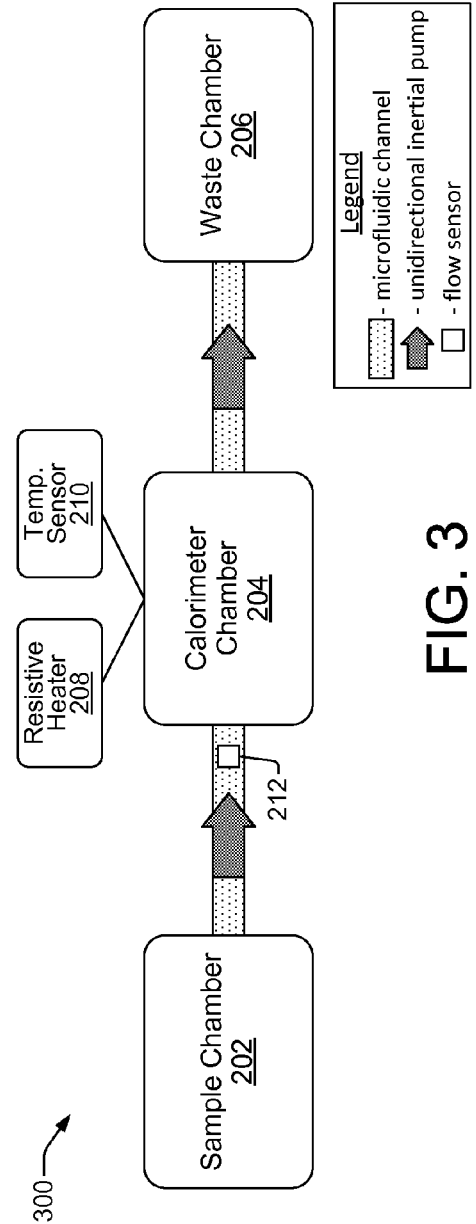

MICROCALORIMETER SYSTEMS

RELATED APPLICATIONS

This application claims priority from, and incorporates in their entirety, the following patent applications: Application No. PCT/US2010/035697, filed May 21, 2010; application Ser. No. 12/833,984, filed Jul. 11, 2010; Application No. PCT/US2010/043480, filed Jul. 28, 2010; Application No. PCT/US2010/054412, filed Oct. 28, 2010; Application No. PCT/US/054458, filed Oct. 28, 2010; Application No. PCT/US2011/021168, filed Jan. 13, 2011; Application No. PCT/US2011/023173, filed Jan. 31, 2011; Application No. PCT/2011/024830, filed Feb. 15, 2011.

BACKGROUND

Calorimetry is the measuring of heat absorbed or evolved in endothermic and exothermic processes, respectively, such as chemical reactions, changes in states of matter, or the mixing of substances to form solutions. Calorimetry is applicable within a wide variety of disciplines such as in biological systems, the pharmaceutical industry, the chemical industry, and so on. Calorimeters provide essential thermodynamic information about substances such as heat capacity, enthalpy and temperature. Calorimeters are used to generate data curves of temperature versus heating that can be analyzed to provide quantitative information about substances of interest. Large-scale calorimeters have been available for many years to provide such thermodynamic information. However, large-scale calorimeters typically involve the use of relatively large substance sample volumes (e.g., on the order of hundreds of microliters), low heating and cooling rates, and long measurement times (e.g., on the order of tens of minutes).

Efforts to make calorimeters more time and cost effective are ongoing. Small-scale calorimeters have various advantages over large-scale calorimeters, such as reduced sample volumes that enable faster heating and cooling rates, decreased measurement times, and lower costs associated with power and sample consumption. One area of development in small-scale calorimeters is with microfluidic devices. Microfluidic devices provide miniaturized environments that facilitate the use of very small sample volumes. Microfabrication techniques enable the fabrication of small-scale microfluidic calorimeters on a chip, called "chip calorimeters", that are capable of analyzing small sample volumes on the order of tens of picoliters.

BRIEF DESCRIPTION OF THE DRAWINGS

The present embodiments will now be described, by way of example, with reference to the accompanying drawings, in which:

FIG. 2 shows a block diagram of an inertial pump-based, calorimeter architecture suitable for implementation on a chip calorimeter to enable calorimetric processing, according to an embodiment;

FIG. 3 shows a block diagram of an inertial pump-based, calorimeter architecture having two integrated inertial pumps, according to an embodiment;

DETAILED DESCRIPTION

Overview of Problem and Solution

Figure 1:
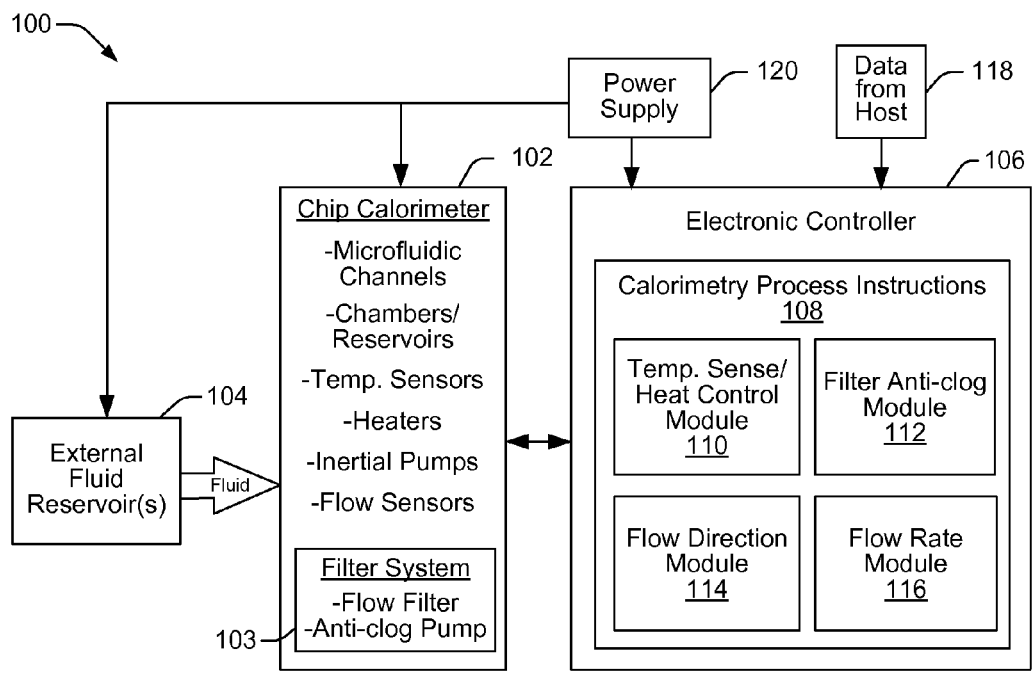
FIG. 1 shows a microcalorimeter system, according to an embodiment.

As noted above, microfabrication techniques have enabled the development of chip calorimeters that offer advantages such as smaller sample volumes and faster measurement and analysis of samples. Other advantages include the potential for parallelization of the calorimetry process and the ability to study individual biological and chemical materials. However, there are ongoing challenges associated with the development of chip calorimeters including, for example, device sensitivity and difficulties in handling picoliter-sized sample volumes. These challenges continue to hinder the practical development and use of chip calorimeters.

Chip calorimeters are generally classified as being either open-chamber or closed-chamber calorimeters. Open-chamber chip calorimeters allow for the deposition of the sample (e.g., a sample droplet) into the calorimeter chamber (reaction/measurement chamber) from outside of the device so that precise deposition tools can be used, such as an inkjet device. Disadvantages with the open-chamber chip calorimeters, however, include the need to have another device available to deliver the sample and the potential for the sample to evaporate. By contrast, in closed-chamber chip calorimeters the samples are introduced to the calorimeter chamber through microfluidic channels. Therefore, closed-chamber chip calorimeters do not suffer the disadvantage of sample evaporation. However, in closed-chamber chip calorimeters the samples have to be pumped into the calorimeter chamber. Typically, external syringe pumps or micropipettes are used to pump the samples to the chamber. A disadvantage with this process, however, is that these external devices are generally too large to be integrated with the chip calorimeter in a microcalorimeter system. In addition, these external pump devices lack the precision to provide accurate sample volumes to the calorimeter chamber.

Embodiments of the present disclosure improve on prior methods of managing small sample volumes in closed-chamber chip calorimeters through the use of micro-inertial pumps integrated within the chip calorimeter. In general, chip calorimeters with integrated micro-inertial pumps enable programmable and flexible protocols to control fluid flow rates and direction, and to prevent and/or recover from clogged filters in compact microcalorimeter systems. Common microfabrication technologies enable large numbers of micro-inertial pumps to be fabricated on a single chip calorimeter (e.g., in the hundreds or thousands). Numerous microfluidic network architectures are suitable for incorporating micro-inertial pumps within chip calorimeters to facilitate the calorimetry process. The integrated micropumps enable large scale parallel calorimetry on a single chip calorimeter.

Microcalorimeter system embodiments having chip-integrated inertial pumps and programmable controllers provide precise control over sample volumes and the movement of samples within chip calorimeters. Flow sensors monitor the flow of fluidic samples and provide feedback to the controller to help maintain accurate sample size. Precise control over the size of sample volumes enables greater accuracy in calorimetric measurements. Control over on-chip filtering systems with anti-clogging pump mechanisms enables the introduction of fluidic samples having particles (e.g., contaminants or blood cells) directly into the chip calorimeter device without the need for upfront processing of the fluid samples. Inertial pumps coupled with filtering and feedback control allow microcalorimeter systems to adapt to sample fluids and to sense and correct from failure modes such as air or particle blockage in filters.

In one example embodiment, a microcalorimeter system includes a first microfluidic channel that couples a calorimeter with a sample chamber. A second microfluidic channel couples the calorimeter with a waste chamber. An inertial pump has a fluid actuator integrated asymmetrically within the first microfluidic channel (i.e., fluid actuators are located/integrated toward ends of the channels rather than at the centers of the channels). The fluid actuator can be selectively activated to pump fluid from the sample chamber to the calorimeter and from the calorimeter to the waste chamber through the first and second microfluidic channels, respectively.

In another example embodiment, a microcalorimeter system includes a first microfluidic channel that couples a solution chamber with a calorimeter, and the calorimeter with a waste chamber. A second microfluidic channel couples an inlet and an outlet of a sample chamber. A filter couples the first and second microfluidic channels, and a first inertial pump is configured to pump solution from the solution chamber, past the filter, and through the calorimeter to the waste chamber. A second inertial pump is configured to pump sample fluid from the outlet of the sample chamber to the inlet of the sample chamber, such that sample from the sample fluid passes through the filter into the solution. Each of the inertial pumps includes a fluid actuator integrated asymmetrically within a respective one of the microfluidic channels, and is capable of selective and controlled activation to pump fluid at varying rates and in different directions through the channels.

Illustrative Embodiments

FIG. 1 shows a microcalorimeter system, according to an embodiment of the disclosure. The microcalorimeter system 100 includes a chip calorimeter 102, and may include external fluid reservoirs 104 to supply calorimetric measurement samples and other fluidic solutions to the chip calorimeter 102. The chip calorimeter 102 is a closed-chamber chip calorimeter that includes microfluidic channels for transporting samples to closed calorimeter chambers where reactions are induced and measured by temperature monitoring. In general, the structures and components of the chip calorimeter 102 can be fabricated using conventional integrated circuit microfabrication techniques such as electroforming, laser ablation, anisotropic etching, sputtering, dry etching, photolithography, casting, molding, stamping, machining, spin coating and laminating.

Although there are various types of calorimeters, chip calorimeter 102 is discussed herein as a differential scanning calorimeter (DSC). While the principles described herein are with reference to specific DSC chip calorimeter embodiments, it is understood and contemplated that such principles may be readily applicable to other types of calorimeter embodiments as are known to those skilled in the art. The two main types of DSC calorimeters are power compensated calorimeters and heat flux calorimeters. In power compensated calorimeters, heat (i.e., power) is applied separately to a sample and to a reference (i.e., in separate chambers) in a controlled manner that maintains a zero temperature differential between the sample and reference chambers. Thus, an active control device is used to adjust the amount of heat applied to the sample and the reference based on feedback that indicates temperature differences between the sample and reference. The difference in the amount of heat applied to the sample and the reference is monitored and analyzed to provide information about the sample being tested. In a heat flux calorimeter, heat (i.e., power) is applied equally to a sample and a reference (i.e., in the same chamber) while the temperatures of the sample and reference are separately monitored. Thus, in the heat flux calorimeter as heat is being applied, the temperature differential between the sample and reference is monitored and can be analyzed to provide information about the sample being tested.

In general, reactions are induced in a calorimetric measurement and reaction chamber on a chip calorimeter 102 through the introduction of heat. The temperature of the chamber is continually monitored as heat is added. Heat is introduced to the calorimeter chamber through heating elements, such as resistive heaters, and the chamber temperature is monitored by a temperature sensor. Heating elements and temperature sensors are integrated into the calorimeter chambers of chip calorimeter 102. Reactions that occur in calorimeter chambers include, for example, chemical reactions and the mixing of substances to form a solution. Exothermic reactions evolve or give off heat, which will cause an increase in the monitored temperature, while endothermic reactions absorb heat, which will cause a plateau or dip in the monitored temperature. Typically, the temperature change is measured within a known quantity of water (or some other fluid whose heat capacity is known) as heat transfers between the water and an exothermic or endothermic reaction.

Microfluidic channels formed on chip calorimeter 102 fluidically couple different chambers (or reservoirs or areas) such as sample chambers, calorimeter chambers, and waste chambers, in a manner that facilitates the proper fluid flow, fluid mixing (i.e., of samples and solutions), sample filtering, reactions, and measurements in the calorimetric process. Inertial pumps integrated within microfluidic channels of chip calorimeter 102 cause fluid flow that transports sample solution to calorimeter chambers for reaction and measurement. The inertial pumps also transport sample solution from calorimeter chambers to waste chambers when the calorimetric process is complete. Chip calorimeter 102 may include one or more fluid flow sensors integrated in microfluidic channels to monitor the flow of fluidic samples and provide feedback to a controller to control fluid flow rates and help maintain accurate sample size. Chip calorimeter 102 may include an integrated filter system 103 to filter samples, such as blood samples, prior to calorimetric testing. While conventional laboratory techniques such as centrifuge separation are typically used to separate blood cells from plasma, the integrated filter system 103 enables the direct introduction of blood samples (and other filterable samples) into the chip calorimeter 102 for calorimetric measurement of plasma without the additional step of external separation. Integrated filter system 103 includes a flow filter and may also include an anti-clog pump to keep the filter from clogging.

The microcalorimeter system 100 also includes an electronic controller 106 to control various functional aspects of calorimetric processing on chip calorimeter 102, such as temperature sensing and heat addition in the calorimeter chambers, and the direction and rate of fluidic flow through microfluidic channels and various chambers. Controller 106 typically includes a processor, firmware, software, one or more memory components including volatile and non-volatile memory components, and other electronics for communicating with and controlling components and functions of chip calorimeter 102, as well as controlling external fluid reservoir(s) 104. Accordingly, electronic controller 106 is a programmable device that typically includes machine-readable instructions (e.g., calorimetric process instructions 108) in the form of one or more software modules, for example, stored in memory and executable on the controller 106 to control calorimetry processing on microchip 102. Such modules may include, for example, a temperature sensing and heat control module 110, a filter anti-clogging module 112, a flow direction module 114, and a rate of flow module 116, as shown in the example embodiment of FIG. 1.

Electronic controller 106 may also receive data 118 from a host system, such as a computer, and temporarily store the data 118 in a memory. Typically, data 118 is sent to microcalorimeter system 100 along an electronic, infrared, optical, or other information transfer path. Data 118 represents, for example, executable instructions and/or parameters for use alone or in conjunction with other executable instructions in software/firmware modules stored on electronic controller 106 to control fluid flow (e.g., sample flow), temperature sensing, heat addition, and other calorimetric-related functions within chip calorimeter 102. For example, various software and data 118 executable on programmable controller 106 enable selective and controlled activation of micro-inertial pumps on chip calorimeter 102 through precise control over the timing, frequency and duration of compressive and tensile fluid displacements generated by fluid actuators integrated into the microfluidic channels of chip calorimeter 102. Readily modifiable (i.e., programmable) control over such fluid actuators through data 118 and/or calorimetry process instructions 108 executable on controller 106, allows for any number of different calorimetric process protocols that can be performed on embodiments of a chip calorimeter 102. Such protocols can be readily adjusted on-the-fly for a given chip calorimeter 102.

Microcalorimeter system 100 also typically includes one or more power supplies 120 to provide power to the chip calorimeter 102, electronic controller 106, external fluidic reservoirs 104, and other electrical components that may be part of the system 100.

FIG. 2 shows a block diagram of an inertial pump-based, calorimeter architecture 200 suitable for implementation on a chip calorimeter 102 to enable calorimetric processing, according to an embodiment of the disclosure. The calorimeter architecture 200 includes a sample chamber 202 for introducing sample to the architecture, a calorimeter chamber 204 for inducing reactions (through heat introduction) and measuring temperature, and a waste chamber 206 for collecting sample after calorimetric processing is complete. The sample chamber 202, calorimeter chamber 204, and the waste chamber 206 are coupled together by microfluidic channels. At least one microfluidic channel includes, or is part of, an integrated inertial pump configured to move fluidic sample between the chambers in the calorimeter architecture 200. In the calorimeter architecture 200 of FIG. 2, for example, an integrated inertial pump is located between the sample chamber 202 and the calorimeter chamber 204. In this embodiment the inertial pump is configured to move sample from the sample chamber 202 to the calorimeter chamber 204 (as indicated by the pump direction arrow), and then from the calorimeter chamber 204 to the waste chamber 206 after calorimetric testing is completed.

In some embodiments, however, calorimeter architectures may include additional inertial pumps integrated in more than one microfluidic channel to better facilitate fluid flow within chip calorimeter 102. For example, FIG. 3 shows a block diagram of an inertial pump-based, calorimeter architecture 300 having two integrated inertial pumps. A first inertial pump is integrated in the microfluidic channel between the sample chamber 202 and the calorimeter chamber 204, and a second inertial pump is integrated in the microfluidic channel between the calorimeter chamber 202 and the waste chamber 206. Although the inertial pumps in architectures 200 and 300 are shown as unidirectional pumps, in other embodiments the inertial pumps can be bidirectional pumps, or some combination of unidirectional and bidirectional pumps. The operation of both unidirectional and bidirectional micro-inertial pumps discussed throughout this disclosure is based on an asymmetric integration of fluid actuators within the microfluidic channels (i.e., fluid actuators are located/integrated toward ends of the channels rather than at the centers of the channels), as well as the generation by those fluid actuators of compressive and tensile fluid displacements whose durations are asymmetric (i.e., not equal). The operation of unidirectional and bidirectional inertial pumps is discussed in detail herein below.

The calorimeter chambers 204 of architectures 200 and 300 include an integrated heating element 208 and temperature sensor 210. Heating element 208 is typically a resistive heater while temperature sensor 210 can be, for example, a thermistor, a resistive thermal device (RTD), a thermocouple, and so on. In some embodiments it is advantageous to use a heating element 208 that functions both as a heating element and a temperature sensor, such as when the heating element is implemented as an RTD or thermistor, for example. In such embodiments, calorimeter chambers 204 do not include separate temperature sensors. For example, FIG. 4 shows a block diagram of an inertial pump-based, calorimeter architecture 400 where the heating element and temperature sensor are implemented together in a single heater/sensor device 402, according to an embodiment of the disclosure.

Figure 4:
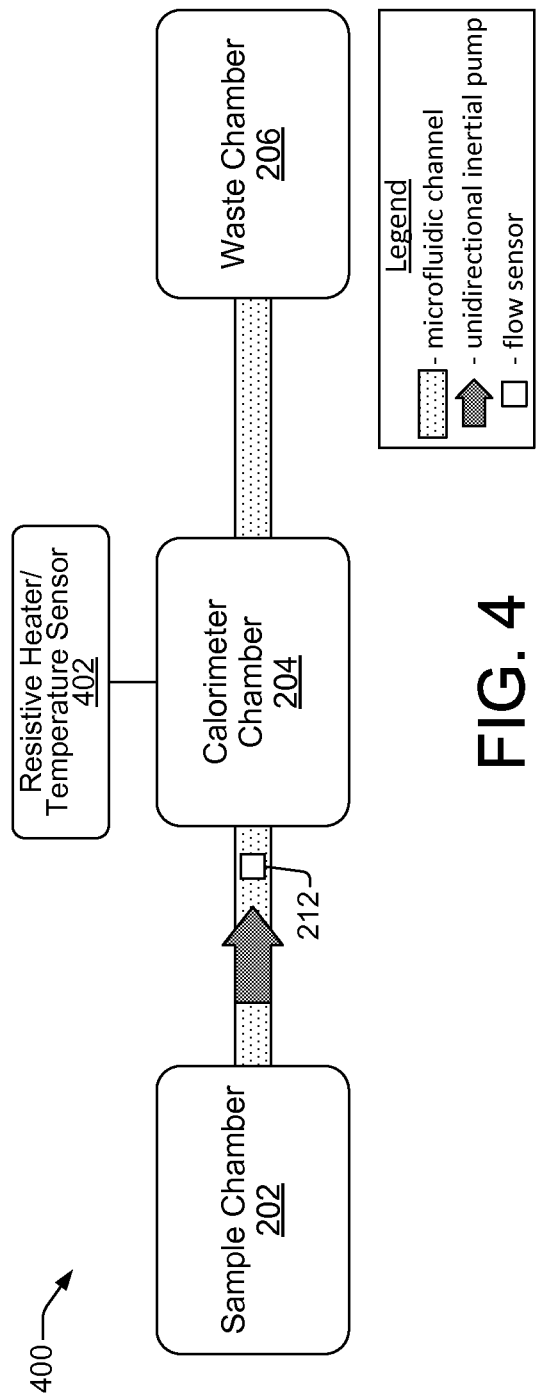
FIG. 4 shows a block diagram of an inertial pump-based, calorimeter architecture where the heating element and temperature sensor are implemented together in a single heater/sensor device, according to an embodiment.

As shown in FIGS. 2-4, calorimeter architectures (200, 300, 400) can also include a fluid flow sensor 212. A flow sensor 212 can be implemented, for example, as a hot-wire anemometer. Such an anemometer includes a wire disposed in a microfluidic channel that provides fluid flow rate information based on a change in the temperature of the wire. For example, a decrease in the temperature of the hot-wire anemometer indicates an increase in fluid flow rate, while an increase in the temperature indicates a decrease in fluid flow rate. Flow rate feedback from flow sensor 212 enables controller 106 (e.g., while executing instructions from flow rate module 116) to control appropriate inertial pumps to maintain the correct sample fluid flow rate through the calorimeter architecture. Flow rates can change, for example, with variations in viscosities of fluidic samples being tested in the chip calorimeter 102. For example, if a particular sample being tested has a high viscosity, the flow rate through microfluidic channels and chambers can slow down. With feedback provided by a flow sensor 212 a slow fluid flow rate can be sensed, enabling controller 106 to alter the pumping activity in an appropriate inertial pump in order to increase the fluid flow rate to a desired level.

Referring still to FIGS. 2-4, calorimetry processing can begin when a sample of interest is deposited in sample chamber 202. A controller 106 selectively activates an appropriate inertial pump, such as the inertial pump between the sample chamber 202 and the calorimeter chamber 204, in order to move a precise volume of fluidic sample at a controlled flow rate from the sample chamber 202 to the calorimeter chamber 204. More specifically, programmable controller 106 is configured to execute instructions from a flow direction module 114 and flow rate module 116, for example, to control the inertial pumps such that they move fluidic sample from the sample chamber 202 to the calorimeter chamber 204, where calorimetry processing takes place. Additional instructions executable on controller 106 from a temperature sensing/heat module 110, for example, direct the controller 106 to add heat to the calorimeter chamber 204 and to monitor temperature through a separate resistive heater 208 and temperature sensor 210 (FIGS. 2, 3), or through a combined heater/sensor 402 (FIG. 4). When the calorimeter process is complete (i.e., when controller 106 has completed a heat versus temperature profile of the sample volume in the calorimeter chamber 204), controller 106 selectively activates appropriate inertial pumps within a microfluidic channel to move the sample volume from the calorimeter chamber 204 to the waste chamber 206.

In general, aspects of the calorimetry process on chip calorimeter 102 are flexibly controlled by programmable controller 106 to achieve a heat versus temperature profile that properly characterizes the sample being tested. For example, as noted above, the flow rate of sample fluid through the microfluidic channels can be monitored by controller 106 via a flow sensor 212 and adjusted by controller 106 via an appropriate inertial pump. Precise flow rate control enables greater accuracy in sample volume sizes delivered to the calorimetry chamber 204, which in turn results in more accurate calorimetry measurement data for the sample being tested. In addition, sample heating rates in the calorimeter chamber 204 can be varied to accommodate both linear heating rates and non-linear heating rates, such as when it is desirable to use chip calorimeter as a modulated temperature differential scanning calorimeter (MTDSC). In MTDSC, instead of heating the sample at a precisely linear rate, small back-and-forth fluctuations in the heating rate are applied to the sample. This enables a heat capacity measurement of the sample, as well as a measurement of reversible reactions.

Figure 5:
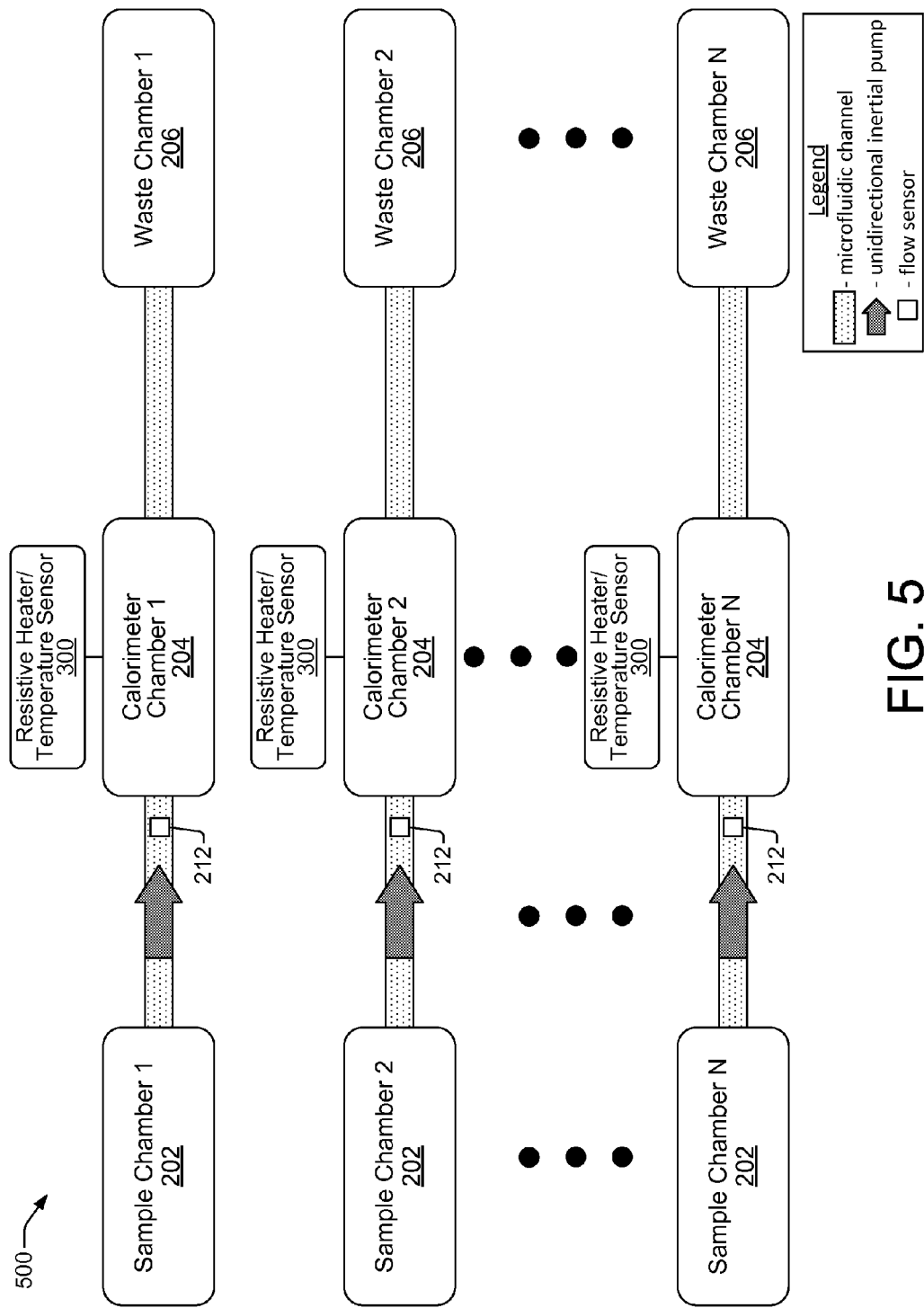
FIG. 5 shows an example of a parallelized, inertial pump-based, calorimeter architecture suitable for implementation on a chip calorimeter to enable parallel calorimetry, according to an embodiment.

Integrating micro-inertial pumps into microfluidic channels on a chip calorimeter 102 enables the parallelization of the calorimetry process on a massive scale. FIG. 5 shows an example of a parallelized, inertial pump-based, calorimeter architecture 500 suitable for implementation on a chip calorimeter 102 to enable parallel calorimetry, according to an embodiment of the disclosure. The calorimeter architecture 500 is similar to the architecture 200 discussed above with regard to FIG. 2, but is duplicated N>>1 times, according to an embodiment of the disclosure. When coupled with the programmable control of a controller 106, parallel calorimeter architectures such as architecture 500 enable virtually unlimited options for calorimetric processing. For example, in the parallel calorimeter architecture 500, each of the N sample chambers 202 can have different samples, and all of the different samples can undergo calorimetric processing in parallel on a single chip calorimeter 102. The calorimetric processing scenarios enabled by such parallel architectures 500 are increased to an even greater degree by the flexibility in calorimetry protocols that can be readily programmed into and implemented by controller 106 to control factors such as sample flow rates, sample volume sizes, and sample heating rates. For example, controller 106 can implement different flow rates, sample sizes and heating rates with respect to each of the N>>1 samples undergoing calorimetric processing in a parallel in architectures 500.

As noted above, chip calorimeter 102 can include an integrated filter system 103. Filter system 103 includes a geometric flow filter that has mechanical features configured to separate particles larger than a specified size from fluid as the fluid flows through the filter. Removing such larger-sized particles prior to calorimetric processing is beneficial, for example, to prevent blockage of microfluidic channels downstream of the filter and/or to prevent contamination of the calorimetric measurements. In some embodiments, a filter system 103 also includes an anti-clogging pump to help clean the filter of particles that might be trapped in its mechanical features, and to prevent the filter from clogging.

Figure 6:
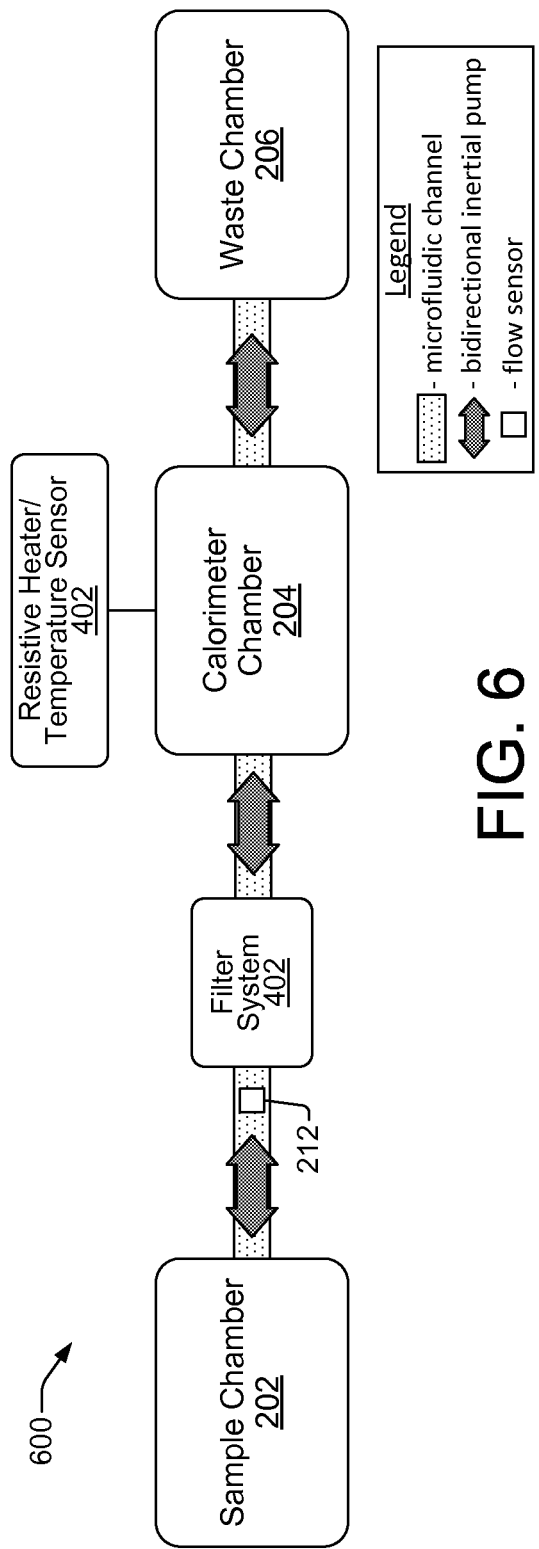
FIG. 6 shows a block diagram of an inertial pump-based, calorimeter architecture with a filter system suitable for implementation on a chip calorimeter to enable calorimetric processing, according to an embodiment.

FIG. 6 shows a block diagram of an inertial pump-based, calorimeter architecture 600 with a filter system suitable for implementation on a chip calorimeter 102 to enable calorimetric processing, according to an embodiment of the disclosure. The calorimeter architecture 600 is similar to architecture 400 discussed above, except that it includes a filter system 602 between the sample introduction chamber 202 and the calorimeter chamber 204. In addition, architecture 600 implements bidirectional inertial pumps instead of unidirectional inertial pumps. The bidirectional inertial pumps can be located variously along the architecture 600 to facilitate fluid flow as called for. For example, there may or may not be a bidirectional inertial pump located between calorimeter chamber 204 and waste chamber 206.

Figure 7:
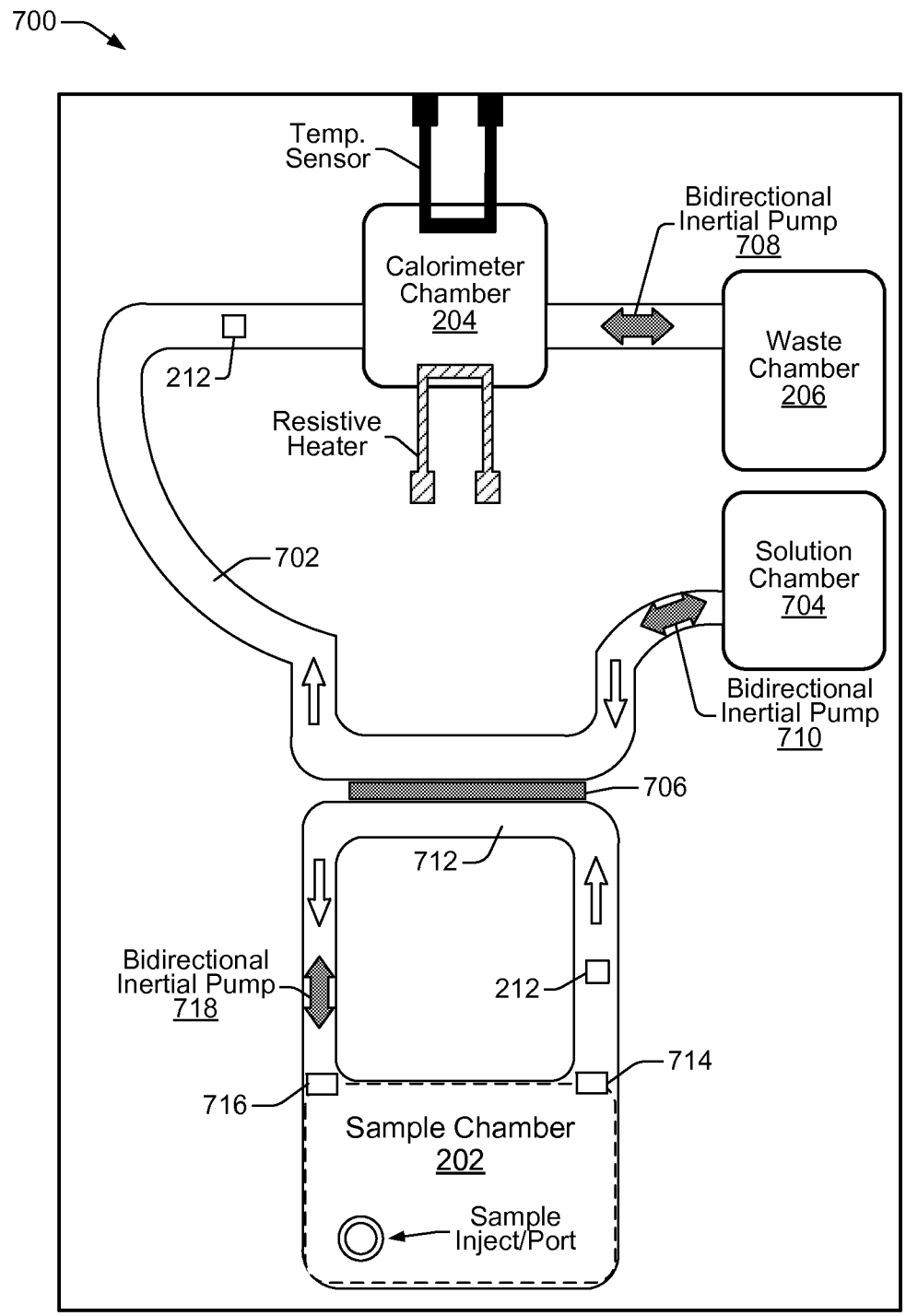
FIG. 7 shows an example of a microchip layout of an inertial pump-based, calorimeter architecture having a filter system that is suitable for implementation on a chip calorimeter to enable calorimetry processing, according to an embodiment.

FIG. 7 shows an example of a microchip layout of an inertial pump-based, calorimeter architecture 700 having a filter system that is suitable for implementation on a chip calorimeter 102 to enable calorimetry processing, according to an embodiment of the disclosure. The calorimeter architecture 700 of FIG. 7 includes a first microfluidic channel 702 that forms a fluidic loop extending from a solution chamber 704 to a waste chamber 206. Microfluidic channel 702 begins at solution chamber 704, passes by a filter system 706, continues to a calorimeter chamber 204, and then proceeds to waste chamber 206. One or more bidirectional inertial pumps such as 708 and 710 are integrated within the microfluidic channel 702 at locations that facilitate controlled flow of fluidic solution from chamber 704 through the channel 702. A common solution used in a solution chamber 704 is water, or some other liquid whose heat capacity is known. Thus, when the solution is mixed with the sample and heated in calorimeter chamber 204, the amount of temperature change measured in the chamber 204 that is attributable to the sample being tested can be readily understood.

Referring still to FIG. 7, calorimeter architecture 700 also includes a second microfluidic channel 712 that forms a loop extending from an outlet 714 of a sample chamber 202 back to an inlet 716 of the chamber 202. Sample chamber 202 typically includes an injection port through which fluidic sample is input to the chamber 202. Microfluidic channel 712 begins at the outlet 714, passes by the filter system 706, and continues back around to the sample chamber inlet 716. An inertial pump 718 is integrated within channel 712 at a location to facilitate controlled flow of sample fluid through the channel 712. The filter system 706 is integrated into and between the microfluidic channels 702 and 712, and provides a size-tolerant, geometric passageway between the channels. The size-tolerant, geometric passageway acts as a filter to prevent particles larger than a specified size from passing into the solution in channel 702 from channel 712. Thus, filter system 706 permits filtered fluidic sample of interest from sample chamber 202 to pass from channel 712 to channel 702 and mix with solution from solution chamber 704 (e.g., water). The sample then moves with solution to calorimeter chamber 204 where it undergoes a calorimetric measurement process. After the calorimetric process is complete, the sample in the solution is pumped to waste chamber 206.

Figure 8A:
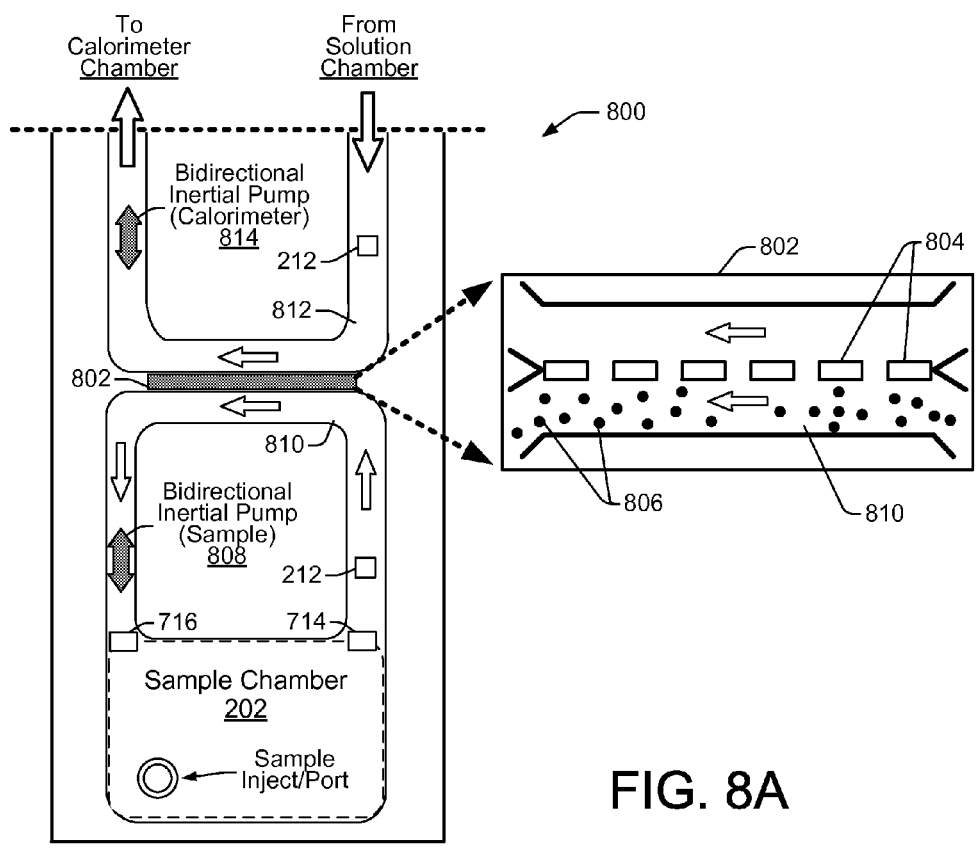
FIGS. 8A, 8B and 8C, show examples of partial microchip layouts of inertial pump-based, calorimeter architectures having filter systems of varying configurations, according to embodiments.
Figure 8B:
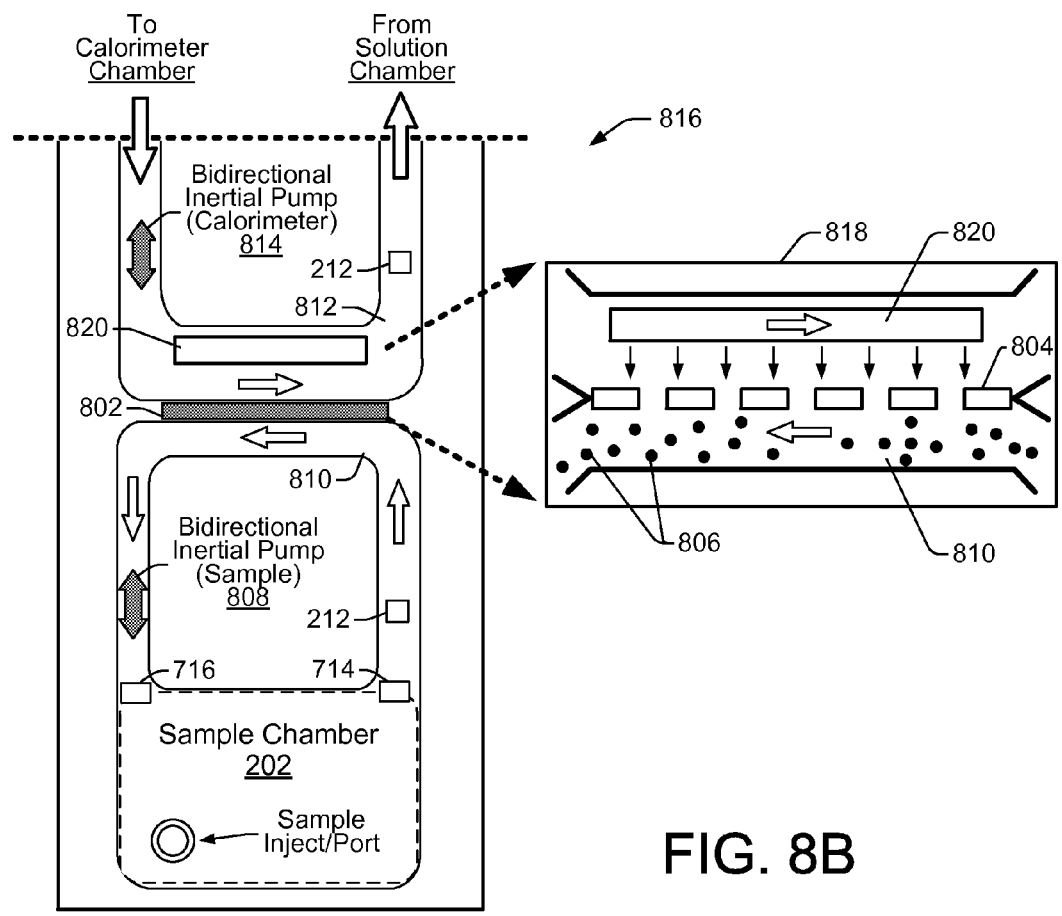
Figure 8C:
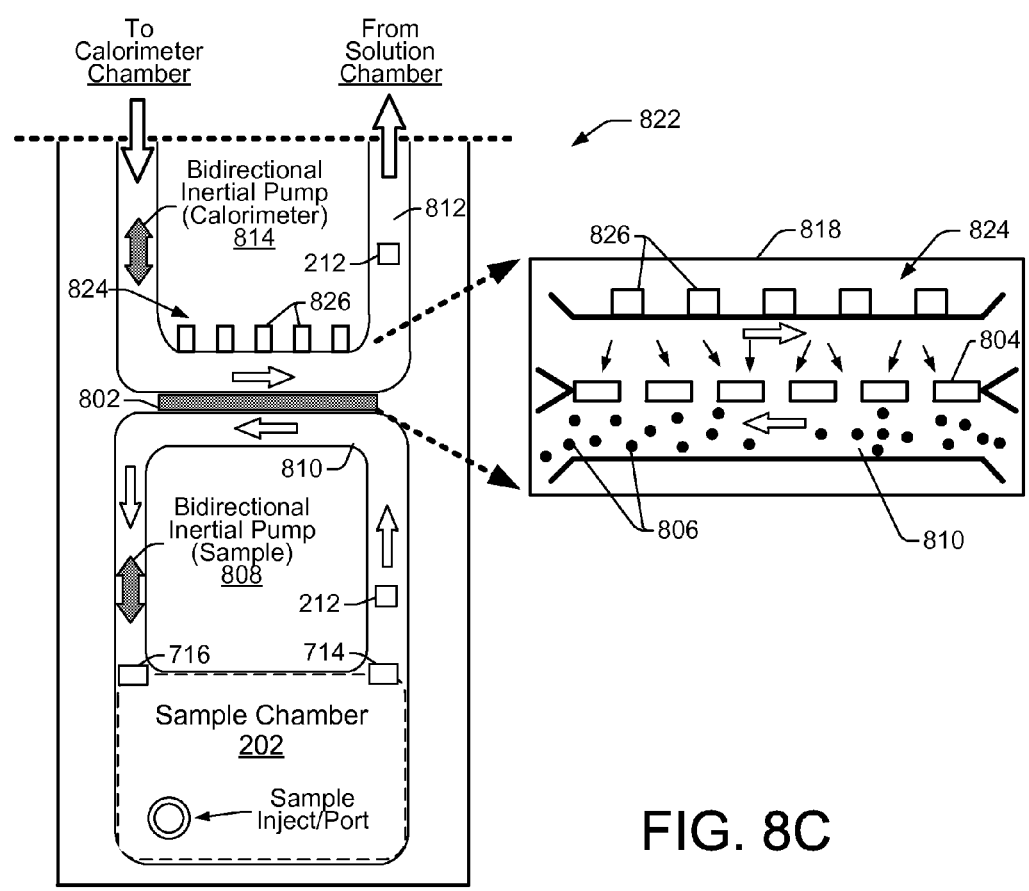

FIGS. 8A, 8B and 8C, show examples of partial microchip layouts of inertial pump-based, calorimeter architectures having filter systems of varying configurations, according to embodiments of the disclosure. FIG. 8A shows a partial calorimeter architecture 800 with a filter system 802 that illustrates the filtering mechanism of a geometric, size-tolerant filter. The filter system 802 is a geometric filter having structures 804 that impede the flow of particles 806 exceeding a specified size. Therefore, as an inertial pump 808 pumps fluidic sample through a sample microfluidic channel 810 and past the filter 802, particles 806 exceeding a specified size do not pass through the shallow channels between the geometric filter structures 804. Only filtered fluidic sample passes through the filter 802 to mix with the solution being pumped by inertial pump 814 through microfluidic channel 812 to the calorimeter chamber.

FIG. 8B shows a partial calorimeter architecture 816 with a counter flow filter system 818 that includes filter 802 and an anti-clogging modular pump 820. One concern with filters such as the geometric, size-tolerant filter 802 of FIG. 8A is the potential for the geometric filter structures 804 to become clogged with particles too large to pass through. One way to reduce the clogging of the filter is to reverse the direction of fluid flow to create a counter flow against the filter. Reversing the flow can disrupt particles that have become lodged in the filter structures 804 and prevent the particles from further clogging the filter. As discussed in greater detail below, bidirectional inertial pumps such as 808 and 814 are controllable by a controller 106 to pump fluid through a microfluidic channel in different directions. Therefore, the direction of fluid flow in either or both of the microfluidic channels 810 and 812 can be reversed. In the architecture 816 shown in FIG. 8B, the direction of fluid flow in channel 812 carrying solution has been reversed.

The anti-clogging modular pump 820 in calorimeter architecture 816 is another way to reduce filter clogging in filters such as the geometric, size-tolerant filter 802. Anti-clogging modular pump 820 includes, for example, a single, larger fluidic actuation device such as a resistor or piezoelectric membrane. When activated, the modular pump 820 generates a normal component of fluid flow within the microfluidic channel at the filter that agitates the fluid in the vicinity of the filter (as indicated by black direction arrows). This agitation helps to prevent particles from clogging the filter structures 804 and disrupts those particles that have become lodged in the filter structures 804. The modular pump 820 can therefore prevent and reverse clogging in filters such as the geometric, size-tolerant filter 802.

FIG. 8C shows a partial calorimeter architecture 822 with a counter flow filter system 818 that includes filter 802 and an anti-clogging pump array 824. As just noted above, reversing the direction of fluid flow and creating a counter flow against the filter can disrupt particles that have become lodged in the filter and prevent the particles from further clogging the filter. The anti-clogging pump array 824 in calorimeter architecture 822 includes numerous fluidic actuation devices 826 such as resistors or piezoelectric membranes. The numerous fluidic actuators 826 in the pump array 824 can be activated in varying sequences to cause different fluidic waveforms to impinge on the filter structures 804 (as indicated by black direction arrows). The impact of such fluctuating fluidic waveforms helps to prevent particles from clogging the filter structures 804 and disrupts those particles that have become lodged in the filter structures 804. Thus, the anti-clogging pump array 824 also prevents and reverses clogging in filters such as the geometric, size-tolerant filter 802.

Although not specifically illustrated, the calorimeter architectures 700, 800, 816 and 822, shown in FIGS. 7-8C, are capable of parallelization in a manner similar to that discussed above with respect to the calorimeter architecture 500 of FIG. 5. Thus, the duplication of these and other calorimeter architectures on a chip calorimeter 102 enables parallelization of such calorimetry processes on a massive scale.

Inertial Pumps

As noted above, the operation of both unidirectional and bidirectional micro-inertial pumps in calorimeter architectures discussed throughout this disclosure is based on the asymmetric integration of fluid actuators within the microfluidic channels (i.e., fluid actuators are located/integrated toward ends of the channels rather than at the centers of the channels), as well as the generation by those fluid actuators of compressive and tensile fluid displacements whose durations are asymmetric (i.e., not equal). Fluid actuators integrated within microfluidic channels at asymmetric locations (i.e., toward the ends of the channels) can generate both unidirectional and bidirectional fluid flow through the channels. Selective activation of multiple fluid actuators located asymmetrically toward the ends of multiple microfluidic channels in a network architecture enables the generation of directionally-controlled fluid flow patterns within the network. In addition, temporal control over the mechanical operation or motion of a fluid actuator enables directional control of fluid flow through a fluidic network channel. Thus, precise control over the forward and reverse strokes (i.e., compressive and tensile fluid displacements) of a single fluid actuator can provide bidirectional fluid flow within a microfluidic network channel to generate directionally-controlled fluid flow patterns within the network.

Fluid actuators can be driven by a variety of actuator mechanisms such as thermal bubble resistor actuators, piezo membrane actuators, electrostatic (MEMS) membrane actuators, mechanical/impact driven membrane actuators, voice coil actuators, magneto-strictive drive actuators, and so on. The fluid actuators and other structures and components of calorimeter architectures (e.g., calorimeter reaction/measurement chambers, microfluidic channels, etc.) on a chip calorimeter 102 can be fabricated using conventional integrated circuit microfabrication techniques such as electroforming, laser ablation, anisotropic etching, sputtering, dry etching, photolithography, casting, molding, stamping, machining, spin coating and laminating.

Figure 9:
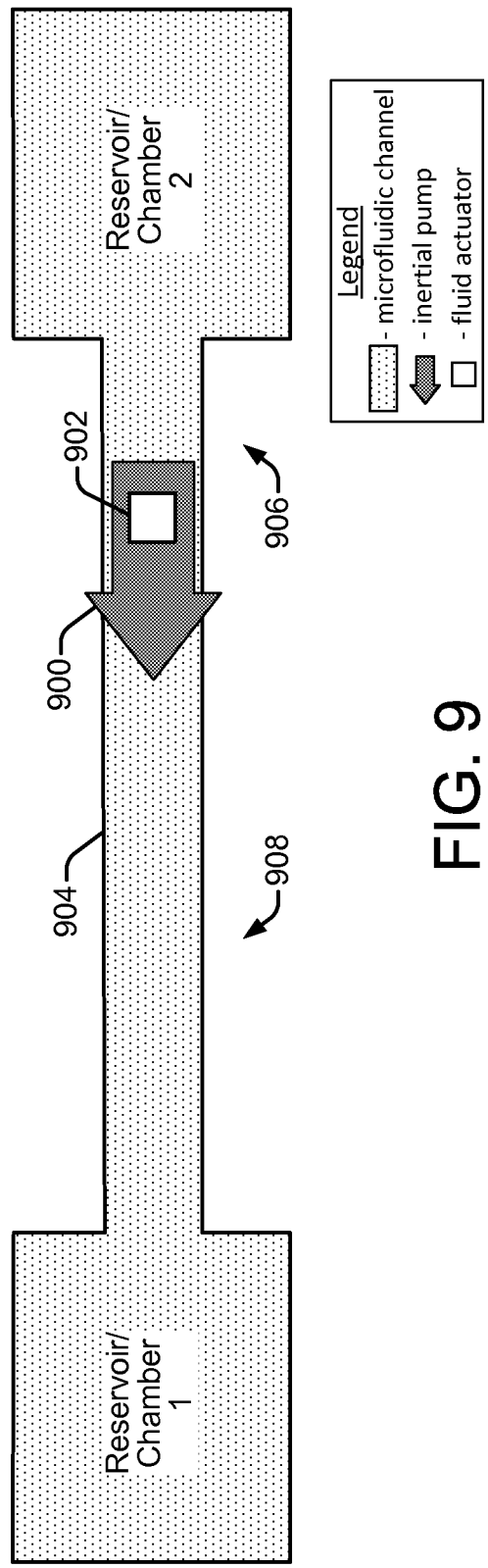
FIG. 9 shows an inertial pump integrated in a microfluidic channel that is suitable for implementing in a calorimeter architecture of a chip calorimeter, according to an embodiment.

FIG. 9 shows an inertial pump integrated in a microfluidic channel that is suitable for implementing in a calorimeter architecture of a chip calorimeter 102, according to an embodiment of the disclosure. Referring generally to FIG. 9, the pumping effect of an inertial pump 900 is based on the action (i.e., fluid displacements) of a fluid actuator 902 located asymmetrically within a fluidic channel 904 (e.g., a microfluidic channel) whose width is narrower than the width of the reservoir or chamber from, or to, which fluid is being pumped. The asymmetric placement of the fluid actuator 902 to one side of the center point of a fluidic channel 904 establishes a short side 906 of the channel and a long side 908 of the channel. Depending on the type of fluid actuator mechanism deployed (see discussion of FIGS. 10-17 below), a unidirectional fluid flow can be achieved in the direction from the short side 906 (i.e., where the fluid actuator is located) to the long side 908 of the channel. A fluid actuator 902 placed symmetrically within a fluidic channel 904 (i.e., at the center of the channel) will generate zero or close to zero net flow. Thus, the asymmetric placement of the fluid actuator 902 within the fluidic channel 904 is one condition that needs to be met in order for an inertial pump 900 to achieve a pumping effect that can generate a net fluid flow through the channel.

However, in addition to the asymmetric placement of the fluid actuator 902 within the fluidic channel 904, another component of the pumping effect of an inertial pump 900 is the manner of operation of the fluid actuator 902. Specifically, to achieve the pumping effect and a net fluid flow through the channel 904, the fluid actuator 902 should also operate asymmetrically with respect to its displacement of fluid within the channel. During operation, a fluid actuator 902 in a fluidic channel 904 deflects, first in one direction and then the other (such as the up and down deflections of a flexible membrane or a piston stroke), to cause fluid displacements within the channel. In general, a fluid actuator 902 generates a wave propagating in the fluidic channel 904 that pushes fluid in two opposite directions along the channel. If the operation of the fluid actuator 902 is such that its deflections displace fluid in both directions with the same speed, then the fluid actuator 902 will generate zero or near zero net fluid flow in the channel 904. Therefore, in order to generate net fluid flow, the operation of the fluid actuator 902 should be configured so that its deflections, or fluid displacements, are not temporally symmetric. That is, an upward deflection into the fluidic channel causing a compressive fluid displacement should not be the same duration as the subsequent downward deflection causing a tensile fluid displacement. Thus, an asymmetric operation of the fluid actuator with respect to the timing of its deflection strokes, or fluid displacements, is a second condition that needs to be met in order for an inertial pump 900 to achieve a pumping effect that can generate a net fluid flow through the channel 904.

Figure 10:
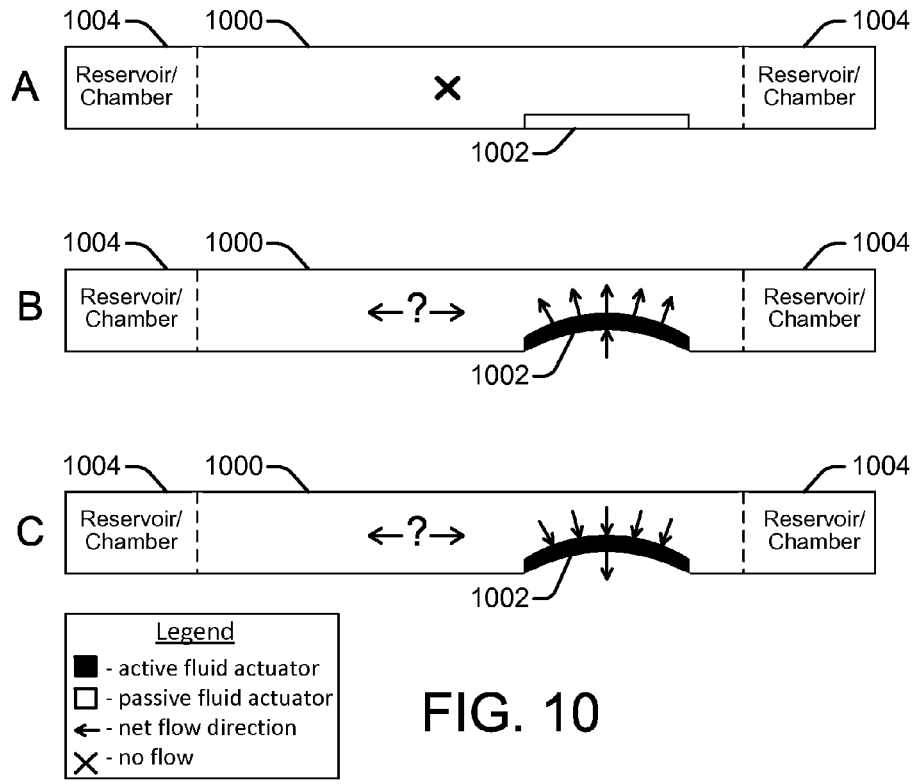
FIG. 10 shows a side view of a microfluidic channel with an integrated inertial pump whose fluid actuator is in different stages of operation, according to an embodiment.

FIG. 10 shows a side view of a microfluidic channel 1000 with an integrated inertial pump whose fluid actuator 1002 is in different stages of operation, according to an embodiment of the disclosure. Fluidic reservoirs or chambers 1004 are connected at each end of the channel 1000. The integrated fluid actuator 1002 is asymmetrically placed at the short side of the channel near an input to a fluidic reservoir 1004, satisfying the first condition needed for an inertial pump to create a pumping effect that can generate a net fluid flow through the channel. The second condition that needs to be satisfied to create a pump effect is an asymmetric operation of the fluid actuator 1002, as noted above. The fluid actuator 1002 is generally described herein as being a piezoelectric membrane whose up and down deflections (sometimes referred to as piston strokes) within the fluidic channel generate fluid displacements that can be specifically controlled (e.g., by a controller 106). However, a variety of other devices can be used to implement the fluid actuator including, for example, a resistive heater to generate a vapor bubble, an electrostatic (MEMS) membrane, a mechanical/impact driven membrane, a voice coil, a magneto-strictive drive, and so on.

At operating stage A shown in FIG. 10, the fluid actuator 1002 is in a resting position and is passive, so there is no net fluid flow through the channel 1000, as indicated by the legend. At operating stage B, the fluid actuator 1002 is active and the membrane is deflecting upward into the fluidic channel 1000. This upward deflection, or forward stroke, causes a compressive (positive) displacement of fluid within the channel 1000 as the membrane pushes the fluid outward. At operating stage C, the fluid actuator 1002 is active and the membrane is beginning to deflect downward to return to its original resting position. This downward deflection of the membrane, or reverse stroke, causes a tensile (negative) displacement of fluid within the channel 1000 as it pulls the fluid downward. An upward and downward deflection is one deflection cycle. A net fluid flow is generated through the channel 1000 if there is temporal asymmetry between the upward deflection (i.e., the compressive displacement) and the downward deflection in repeating deflection cycles. The question marks in FIG. 10 between opposite net flow direction arrows for the operating stages B and C merely indicate that the particular temporal asymmetry between the compressive and tensile displacements of the fluid actuator 1002 has not yet been specified, and therefore the direction of flow, if any, is not yet known. Directional flow is discussed below with reference to FIGS. 11-14.

Figure 11:
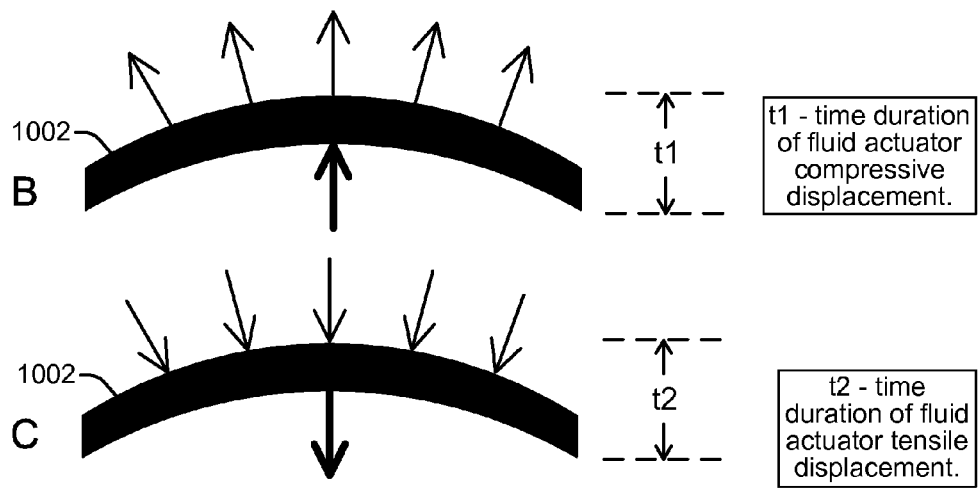
FIG. 11 shows the active fluid actuator at the operating stages from FIG. 10, according to an embodiment.

FIG. 11 shows the active fluid actuator 1002 at the operating stages B and C from FIG. 10, along with time markers "t1" and "t2" to help illustrate temporal asymmetry between compressive and tensile displacements generated by the fluid actuator 1002, according to an embodiment of the disclosure. The time t1 is the time it takes for the fluid actuator membrane to deflect upward, generating a compressive fluid displacement. The time t2 is the time it takes for the fluid actuator membrane to deflect downward, or back to its original position, generating a tensile fluid displacement. Asymmetric operation of the fluid actuator 1002 occurs if the t1 duration of the compressive displacement (upward membrane deflection) is greater or lesser than (i.e., not the same as) the t2 duration of the tensile displacement (downward membrane deflection). Such asymmetric fluid actuator operation over repeating deflection cycles generates a net fluid flow within the channel 1000. However, if the t1 and t2 compressive and tensile displacements are equal, or symmetric, there will be little or no net fluid flow through the channel 1000, regardless of the asymmetric placement of the fluid actuator 1002 within the channel 1000.

Figure 12:
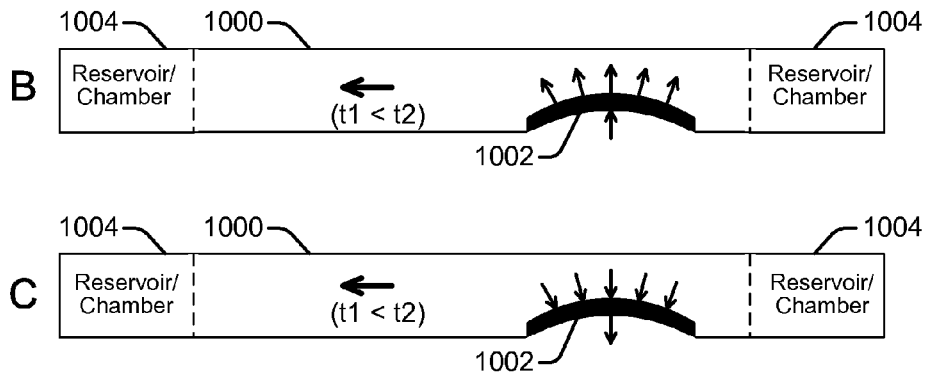
FIGS. 12, 13 and 14 show the active fluid actuator at the operating stages from FIG. 10, including net fluid flow direction arrows, according to some embodiments.
Figure 13:
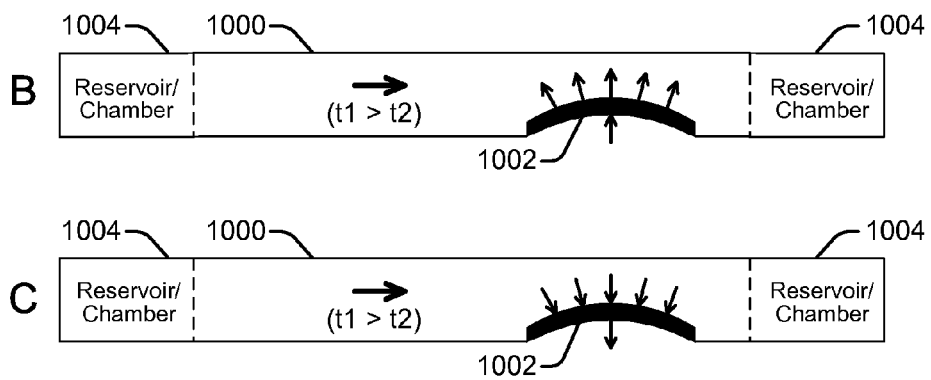
Figure 14:
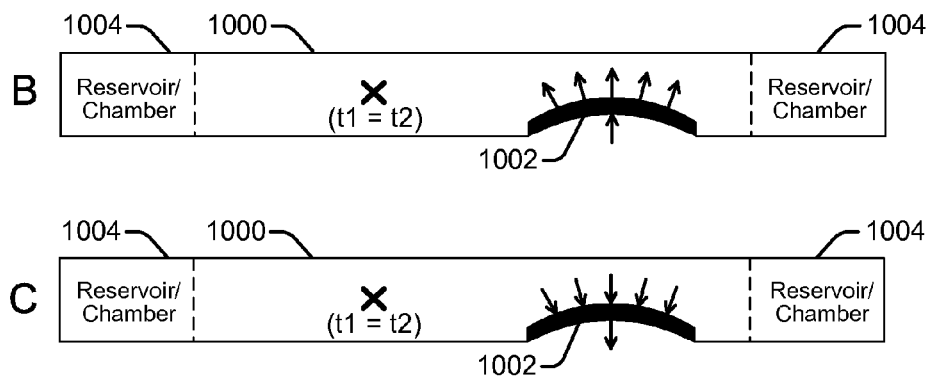
Figure 15:
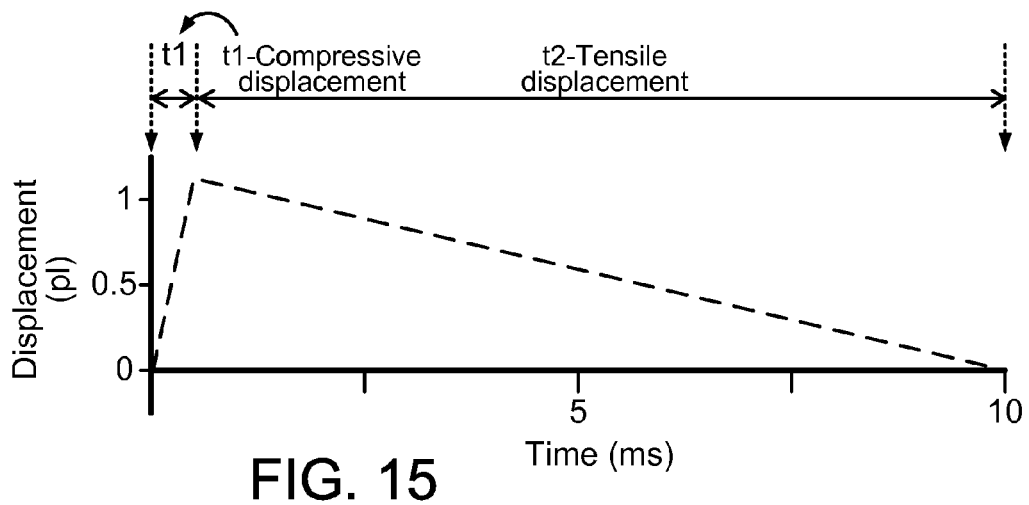
FIGS. 15, 16 and 17 show example displacement pulse waveforms, according to some embodiments.
Figure 16:
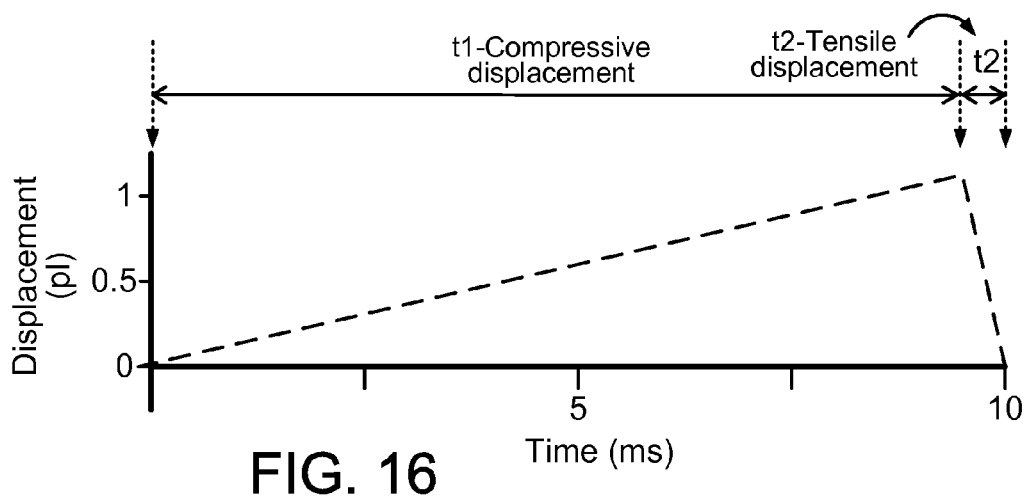
Figure 17:
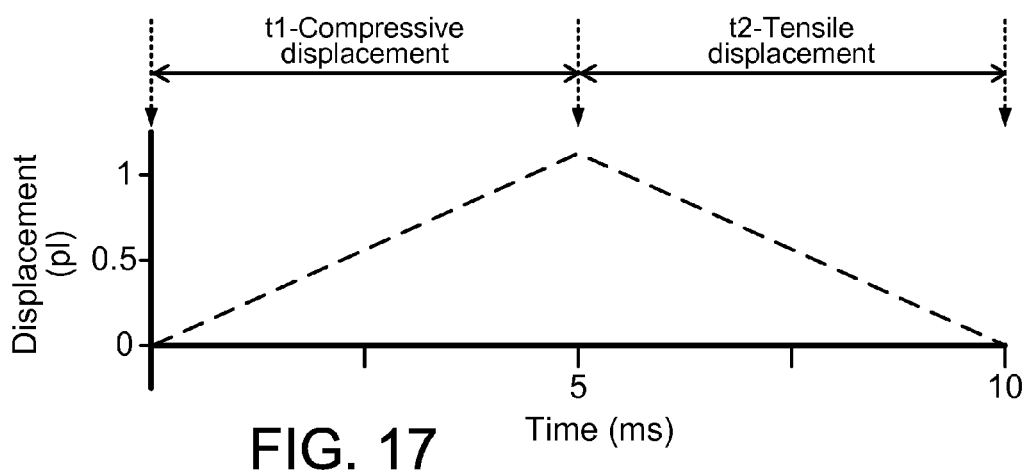

FIGS. 12, 13 and 14 show the active fluid actuator 1002 at the operating stages B and C from FIG. 10, including net fluid flow direction arrows that indicate which direction fluid flows through the channel 1000, if at all, according to embodiments of the disclosure. The direction of the net fluid flow depends on the compressive and tensile displacement durations (t1 and t2) from the actuator. FIGS. 15, 16 and 17 show example displacement pulse waveforms whose durations correspond respectively with the displacement durations t1 and t2 of FIGS. 12, 13 and 14. For various fluid pump actuators the compressive displacement and tensile displacement times, t1 and t2, can be precisely controlled by a controller 106, for example, executing instructions from an instruction module 114 (flow direction module 114) within a microfluidic system such as a microcalorimeter system 100.

Referring to FIG. 12, the compressive displacement duration, t1, is less than the tensile displacement duration, t2, so there is a net fluid flow in a direction from the short side of the channel 1000 (i.e., the side where the actuator is located) to the long side of the channel. The difference between the compressive and tensile displacement durations, t1 and t2, can be seen in FIG. 15 which shows a corresponding example displacement pulse waveform that might be generated by the fluid actuator with a compressive displacement duration of t1 and a tensile displacement duration of t2. The waveform of FIG. 15 indicates a displacement pulse/cycle on the order of 1 pico-liter (pl) with the compressive displacement duration, t1, of approximately 0.5 microseconds (ms) and the tensile displacement duration, t2, of approximately 9.5 ms. The values provided for the fluid displacement amount and displacement durations are only examples and not intended as limitations in any respect.

In FIG. 13, the compressive displacement duration, t1, is greater than the tensile displacement duration, t2, so there is a net fluid flow in the direction from the long side of the channel 1000 to the short side of the channel. The difference between the compressive and tensile displacement durations, t1 and t2, can be seen in FIG. 16 which shows a corresponding example displacement pulse waveform that might be generated by the fluid actuator with a compressive displacement duration of t1 and a tensile displacement duration of t2. The waveform of FIG. 16 indicates a displacement pulse/cycle on the order of 1 pico-liter (pl) with the compressive displacement duration, t1, of approximately 9.5 microseconds (ms) and the tensile displacement duration, t2, of approximately 0.5 ms.

In FIG. 14, the compressive displacement duration, t1, is equal to the tensile displacement duration, t2, so there is little or no net fluid flow through the channel 1000. The equal compressive and tensile displacement durations of t1 and t2, can be seen in FIG. 17 which shows a corresponding example displacement pulse waveform that might be generated by the fluid actuator with a compressive displacement duration of t1 and a tensile displacement duration of t2. The waveform of FIG. 17 indicates a displacement pulse/cycle on the order of 1 pico-liter (pl) with the compressive displacement duration, t1, of approximately 5.0 microseconds (ms) and the tensile displacement duration, t2, of approximately 5.0 ms.

Note that in FIG. 14, although there is asymmetric location of the fluid actuator 1002 within the channel 1000 (satisfying one condition for achieving the pump effect), there is still little or no net fluid flow through the channel 1000 because the fluid actuator operation is not asymmetric (the second condition for achieving the pump effect is not satisfied). Likewise, if the location of the fluid actuator was symmetric (i.e., located at the center of the channel), and the operation of the actuator was asymmetric, there would still be little or no net fluid flow through the channel because both of the pump effect conditions would not be satisfied.

From the above examples and discussion of FIGS. 10-17, it is useful to note the interaction between the pump effect condition of asymmetric location of the fluid actuator and the pump effect condition of asymmetric operation of the fluid actuator. That is, if the asymmetric location and the asymmetric operation of the fluid actuator work in the same direction, the fluid pump actuator will demonstrate a high efficiency pumping effect. However, if the asymmetric location and the asymmetric operation of the fluid actuator work against one another, the asymmetric operation of the fluid actuator reverses the net flow vector caused by the asymmetric location of the fluid actuator, and the net flow is from the long side of the channel to the short side of the channel 1000.

In addition, from the above examples and discussion of FIGS. 10-17, it can now be better appreciated that the fluid pump actuator 902 discussed above with respect to the inertial pump 900 of FIG. 9 (shown as a unidirectional inertial pump) is assumed to be an actuator device whose compressive displacement durations are less than its tensile displacement durations. An example of such an actuator is a resistive heating element that heats the fluid and causes displacement by an explosion of supercritical vapor. Such an event has an explosive asymmetry whose expansion phase (i.e., compressive displacement) is faster than its collapse phase (i.e., tensile displacement). The asymmetry of this event cannot be controlled in the same manner as the asymmetry of deflection caused by a piezoelectric membrane actuator, for example. However, as the examples and discussion of FIGS. 10-17 show, the fluid pump actuator 902 of FIG. 9 can also be an actuator device such as a piezoelectric membrane whose fluid displacements can be specifically controlled by controlling the durations of the up and down deflections of the membrane within the fluidic channel.

Figure 18:
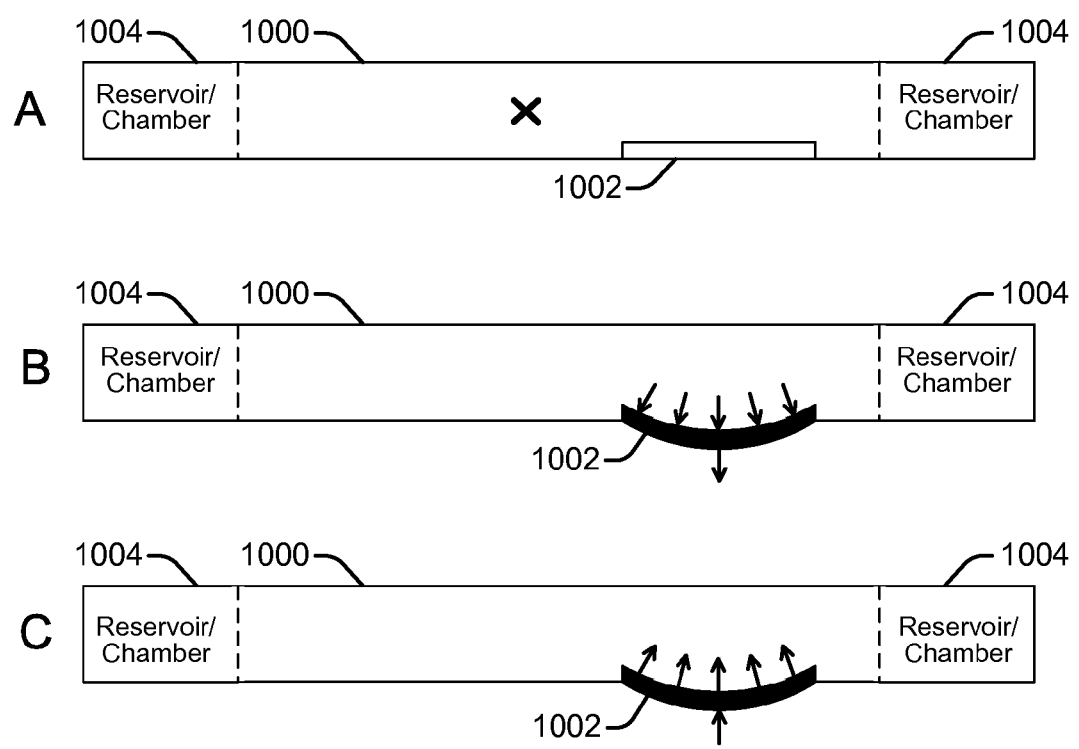
FIG. 18 shows a side view of an example microfluidic channel with an integrated inertial pump whose fluid actuator is in different stages of operation, according to an embodiment.

FIG. 18 shows a side view of an example microfluidic channel 1000 with an integrated inertial pump whose fluid actuator 1002 is in different stages of operation, according to an embodiment of the disclosure. This embodiment is similar to that shown and discussed regarding FIG. 10 above, except that the deflections of the fluid actuator membrane are shown working differently to create compressive and tensile displacements within the channel 1000. At operating stage A shown in FIG. 18, the fluid actuator 1002 is in a resting position and is passive, so there is no net fluid flow through the channel 1000. At operating stage B, the fluid actuator 1002 is active and the membrane is deflected downward and outside of the fluidic channel 1000. This downward deflection of the membrane causes a tensile displacement of fluid within the channel 1000, as it pulls the fluid downward. At operating stage C, the fluid actuator 1002 is active and the membrane is beginning to deflect upward to return to its original resting position. This upward deflection causes a compressive displacement of fluid within the channel 1000, as the membrane pushes the fluid upward into the channel. A net fluid flow is generated through the channel 1000 if there is temporal asymmetry between the compressive displacement and the tensile displacement. The direction of a net fluid flow is dependent upon the durations of the compressive and tensile displacements, in the same manner as discussed above.

Figure 19:
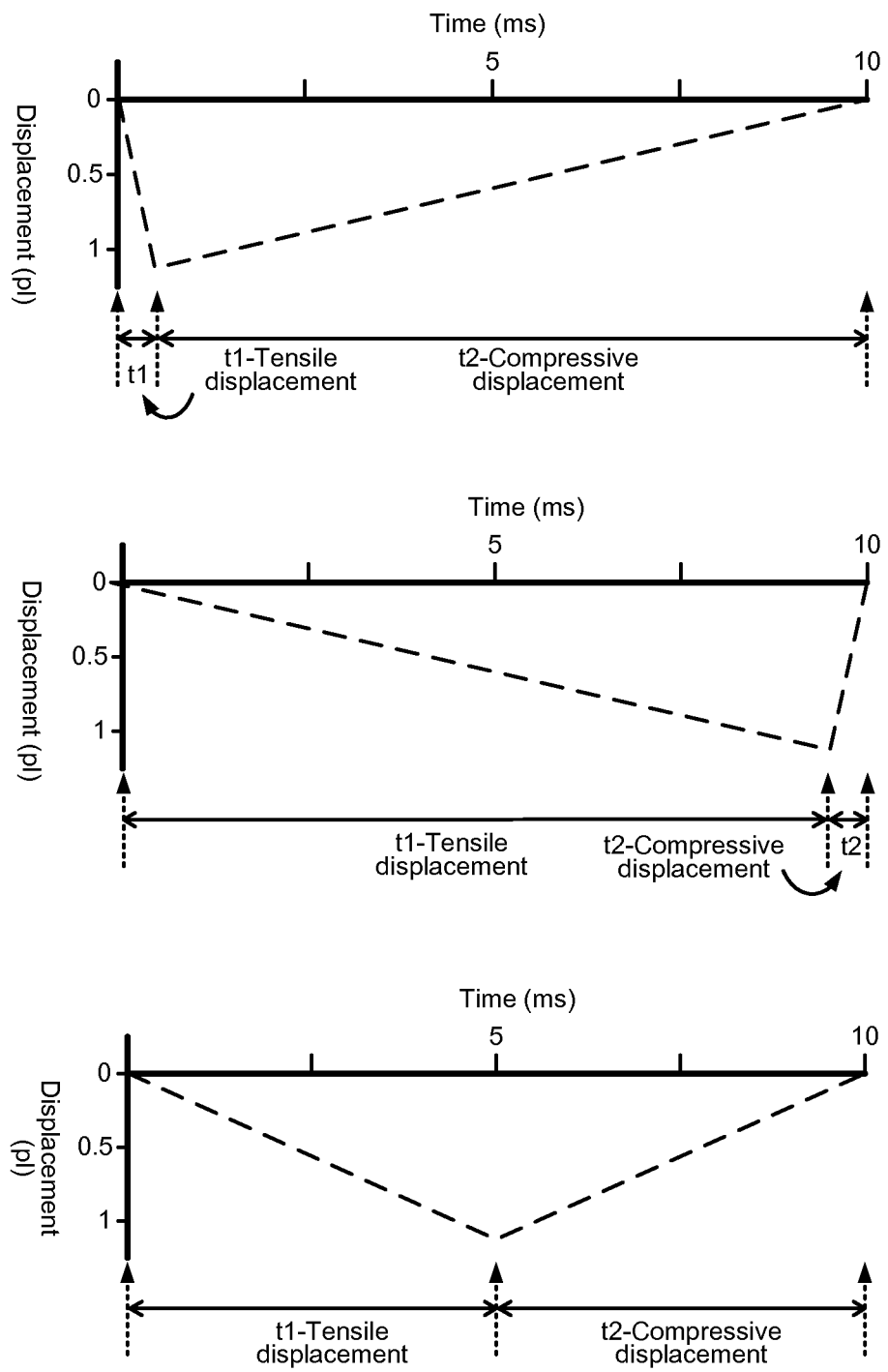
FIG. 19 shows example displacement pulse waveforms whose durations correspond with displacement durations of a fluid actuator, according to embodiments.

FIG. 19 shows example displacement pulse waveforms whose durations may correspond respectively with displacement durations t1 and t2 of the actuator 1002 of FIG. 18, according to embodiments of the disclosure. The waveforms in FIG. 19 show the tensile (negative) displacement occurring before the compressive (positive) displacement. In both the previous examples discussed above, the fluid actuator 1002 begins in a resting position and then either produces a compressive (positive) displacement followed by a tensile (negative) displacement, or it produces a tensile displacement followed by a compressive displacement. However, various other displacement examples and corresponding waveforms are possible. For example, the fluid actuator 1002 can be pre-loaded in a particular direction and/or it can traverse its resting position such that it deflects both into the channel 1000 and out of the channel 1000 as it produces compressive and tensile displacements.

Figure 20:
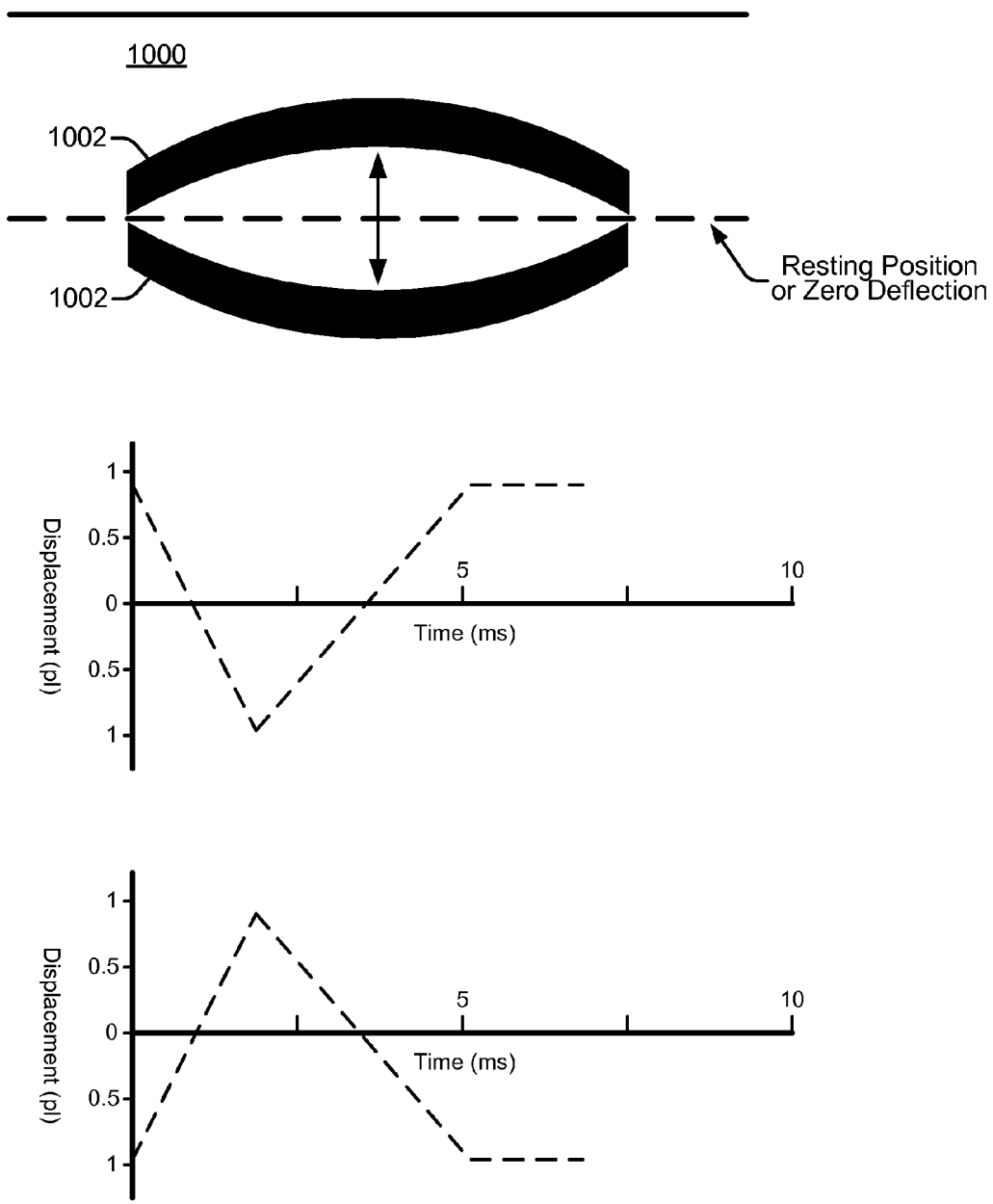
FIG. 20 shows an example representation of a fluid actuator deflecting both into and out of a channel, along with representative displacement pulse waveforms, according to an embodiment.

FIG. 20 shows an example representation of a fluid actuator 1002 deflecting both into and out of a microfluidic channel 1000, along with representative displacement pulse waveforms to illustrate both how the actuator 1002 can deflect into the channel 1000 and out of the channel 1000 as it produces compressive and tensile displacements and the possible pre-loading of the actuator 1002 in a positive or negative deflection. Such deflections of the actuator 1002 into and out of channel 1000 and pre-loading of the actuator 1002 are controlled, for example, by instruction modules (e.g., flow direction module 114, flow rate module 116) executing on electronic controller 106.

What is claimed is:

1. A microcalorimeter system comprising:
   a first microfluidic channel coupling a calorimeter with a sample chamber;
   a second microfluidic channel coupling the calorimeter with a waste chamber;
   an inertial pump comprising a fluid actuator integrated asymmetrically within the first microfluidic channel, wherein the fluid actuator is positioned asymmetrically within the first microfluidic channel, and is to be operated asymmetrically with compressive and tensile fluid displacements to pump fluid from the sample chamber to the calorimeter and from the calorimeter to the waste chamber through the first and second microfluidic channels, respectively,
   wherein a compressive fluid displacement of the fluid actuator comprises deflection of a membrane of the fluid actuator in a first direction relative to the first microfluidic channel, and a tensile fluid displacement of the fluid actuator comprises deflection of the membrane of the fluid actuator in a second direction opposite the first direction.

2. A microcalorimeter system as in claim 1, further comprising a second inertial pump comprising a fluid actuator integrated asymmetrically within the second microfluidic channel.

3. A microcalorimeter system as in claim 1, further comprising a microchip on which the chambers, the calorimeter, the microfluidic channels and the inertial pump are fabricated.

4. A microcalorimeter system as in claim 1, wherein the chambers, the calorimeter, the microfluidic channels and the inertial pump comprise a microcalorimeter architecture, the system further comprising:
   a plurality of microcalorimeter architectures fabricated in parallel on a microchip.

5. A microcalorimeter system as in claim 1, further comprising a filter integrated within the first microfluidic channel to filter fluid flowing from the sample chamber to the calorimeter.

6. A microcalorimeter system as in claim 1, wherein the calorimeter comprises:
   a calorimeter chamber;
   a temperature sensor to sense fluid temperature in the calorimeter chamber; and
   a heater to heat fluid in the calorimeter chamber.

7. A microcalorimeter system as in claim 6, wherein the temperature sensor and the heater comprise a single device selected from the group consisting of a thermistor, a thermopile, and a resistive thermal device.

8. A microcalorimeter system as in claim 6, further comprising:
   a controller; and
   an instruction module executable by the controller to control temperatures in the calorimeter through monitoring the temperature sensor and selectively activating the heater.

9. A microcalorimeter system as in claim 1, further comprising:
   a controller; and
   an instruction module executable by the controller to control fluid flow direction and fluid flow rate within a microfluidic channel through selective and controlled activation of the fluid actuator.

10. A microcalorimeter system as in claim 9, wherein controlled activation of the fluid actuator comprises controlling compressive and tensile fluid displacement durations of the fluid actuator.

11. A microcalorimeter system as in claim 9, further comprising an anemometer integrated within a microfluidic channel to sense the fluid flow rate.

12. A microcalorimeter system as in claim 1, wherein the fluid actuator is operated asymmetrically with compressive and tensile fluid displacements of different duration.

13. A microcalorimeter system as in claim 12, wherein a compressive fluid displacement duration of the fluid actuator is greater than a tensile fluid displacement duration of the fluid actuator.

14. A microcalorimeter system as in claim 12, wherein a tensile fluid displacement duration of the fluid actuator is greater than a compressive fluid displacement duration of the fluid actuator.

* * * * *